United States Patent
Hwang et al.

(10) Patent No.: US 8,362,388 B2
(45) Date of Patent: Jan. 29, 2013

(54) MULTI-GAS MIXER AND DEVICE FOR SUPPLYING GAS MIXTURE TO PLASMA TORCH

(75) Inventors: Chang-Sing Hwang, Taoyuan County (TW); Chun-Huang Tsai, Taoyuan County (TW); Nian-Tzu Suen, Taoyuan County (TW); Jen-Feng Yu, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 604 days.

(21) Appl. No.: 12/608,311

(22) Filed: Oct. 29, 2009

(65) Prior Publication Data

US 2010/0326966 A1    Dec. 30, 2010

(30) Foreign Application Priority Data

Jun. 26, 2009    (TW) ................ 98121533 A (51) Int. Cl.
*H05H 1/34*    (2006.01)
*B01F 13/02*    (2006.01)

(52) U.S. Cl. ......... 219/121.55; 219/121.11; 219/121.36; 219/121.54; 366/101; 366/103; 366/107; 366/336; 366/337; 366/341

(58) Field of Classification Search ............. 219/121.48, 219/121.51; 366/105, 107, 235, 290, 340
See application file for complete search history.

(56) References Cited

U.S. PATENT DOCUMENTS

| | | | |
|---|---|---|---|
| 4,560,284 A * | 12/1985 | Chen | 366/336 |
| 4,614,440 A * | 9/1986 | King | 366/336 |
| 4,632,568 A * | 12/1986 | Emele et al. | 366/337 |
| 4,793,712 A | 12/1988 | Kostecki | |
| 5,232,283 A * | 8/1993 | Goebel et al. | 366/336 |
| 5,489,154 A * | 2/1996 | Algreen-Ussing | 366/338 |
| 5,846,330 A * | 12/1998 | Quirk et al. | 118/723 DC |
| 5,900,168 A * | 5/1999 | Saio et al. | 219/121.44 |
| 6,232,575 B1 * | 5/2001 | Oakley et al. | 219/121.55 |

(Continued)

FOREIGN PATENT DOCUMENTS

TW    270898    2/1996
TW    578450 B    3/2004

OTHER PUBLICATIONS

Intellectual Property Office, Ministry of Economic Affairs, R.O.C., "Office Action", Jul. 5, 2012, Taiwan.

*Primary Examiner* — Wai Sing Louie
*Assistant Examiner* — William Harriston
(74) *Attorney, Agent, or Firm* — Morris Manning & Martin LLP; Tim Tingkang Xia, Esq.

(57) ABSTRACT

A multi-gas mixer for supplying a gas mixture that can uniformly mix a plurality of gases according to the proportional percentages determined by the mass flow rate of each gas is disclosed. The multi-gas mixer comprises a mixer chamber, a plurality of gas inlets, a gas mixture outlet, and at least one gas rotating and mixing unit. The present invention also provides a method for controlling the percentage of each gas to be mixed by use of a plurality of mass flow rate controllers to control the gas flow to produce a gas mixture according to a predetermined proportionality. When the multi-gas mixer delivers a gas mixture to a high-speed plasma torch, the torch can be stably operated under a high voltage (>85V) and a medium current (<650 A) so that a long-arc, high-temperature and high-speed plasma flame can be generated.

27 Claims, 9 Drawing Sheets

U.S. PATENT DOCUMENTS

| | | | |
|---|---|---|---|
| 6,333,481 B2 * | 12/2001 | Augeraud et al. | 219/121.59 |
| 7,326,875 B2 * | 2/2008 | Krink et al. | 219/121.59 |
| 7,954,514 B2 * | 6/2011 | Tung et al. | 138/37 |
| 8,129,652 B2 * | 3/2012 | Hampton | 219/74 |
| 2003/0034334 A1 * | 2/2003 | Furujo | 219/121.55 |
| 2010/0162752 A1 * | 7/2010 | Tabata et al. | 62/606 |

* cited by examiner

MULTI-GAS MIXER AND DEVICE FOR SUPPLYING GAS MIXTURE TO PLASMA TORCH

1. FIELD OF THE INVENTION

The present invention generally relates to a multi-gas mixer and, more particularly, to a multi-gas mixer capable of uniformly mixing gases with arbitrary percentages.

2. BACKGROUND OF THE INVENTION

With the increasing demand of gas mixtures, it has become more and more crucial to efficiently produce the gas mixtures. Presently, a certain amount of mixed gas (such as argon-hydrogen) is mixed and sealed in a steel cylinder before being shipped to the user. In this case, if the user desires to use a gas mixture by multi-gases with different percentages, lots of steel cylinders are required to be prepared in the factory, which leads to large space and thus inconvenience for both the factory and the user.

More particular, a conventional plasma torch generally achieves desired plasma flame characteristics by adjusting the plasma gas flow and the working current of the plasma torch according to practical demand, which leads to higher cost due to frequent replacement of electrodes that are easily worn out.

Accordingly, some conventional techniques have been reported to uniformly mix the gases with different densities within a large range. However, it is still difficult to optimize the percentages of gases by the use of T-shaped joints and nozzles.

Conventionally, U.S. Pat. No. 4,793,712 discloses a gas mixer capable of being used in plasma spray coating. The gas mixer uses three filter chambers, each being provided on the wall with pores with different diameters (for example, 60, 45 and 20 microns). These pores are used for directing at least two gas flows to mix the same. One of the two gas flows is hydrogen, helium or pre-mixed hydrogen-helium, while the other is argon, nitrogen or pre-mixed argon-nitrogen. If the user desires a gas mixture comprising hydrogen, helium, argon and nitrogen, pre-mixed hydrogen-helium and pre-mixed argon-nitrogen are further mixed by the gas mixer to produce hydrogen-helium-argon-nitrogen. However, the method for controlling the percentages of gas is not disclosed.

U.S. Pat. No. 6,333,481 B2 discloses a device for generating an arc plasma using a gas mixture of argon-hydrogen or nitrogen-hydrogen for cutting. The gas mixer is provided with two gas inlets for introducing two kinds of gas. Even though it requires external control means to precisely control the percentage of each gas in a gas mixture, the control method and hardware for external control are not presented.

U.S. Pat. No. 7,326,875 B2 discloses a device and a method for producing a gas mixture for performing plasma cutting, wherein the percentage of each gas in the gas mixture is precisely controlled by controlling the flow rate and the pressure of the gas. However, a pressure sensor is required for each gas to detect a pressure signal and a signal processor is required for processing the pressure signal for each gas. Moreover, the patent only provides a gas mixture of argon, nitrogen and hydrogen.

Even though the above-mentioned prior art references disclose some useful techniques on the gas mixer and application thereof, there is still need in providing a multi-gas mixer capable of uniformly mixing gases with arbitrary percentages. Accordingly, the present discloses a multi-gas mixer capable of uniformly mixing gases with arbitrary percentages.

SUMMARY OF THE INVENTION

It is one object of the present invention to provide a multi-gas mixer capable of uniformly mixing gases with arbitrary percentages. The multi-gas mixer comprises a plurality of gas inlets for mixing a plurality of kinds of gas and a plurality of gas rotating and mixing units so that all the kinds of gas can be rapidly and uniformly mixed. Each gas inlet can be further coupled to a mass flow rate controller to control the flow rate of each gas so as to produce a gas mixture with desired pencentage.

In order to precisely control the percentage of each gas in a gas mixture, the present invention uses a mass flow rate controller to control the flow rate of each gas. A formula $R_n = F_n / (F_1 + F_2 + F_3 + \ldots + F_N)$ is used to calculate the percentage of a certain kind of gas n, $R_n$, where N is the number of the kinds of gas, $F_n$ is the flow rate of the gas n, and n=1, 2, 3, ... or N.

It is another object of the present invention to provide a multi-gas mixing apparatus, capable of adjusting the plasma flame characteristics. The multi-gas mixing apparatus achieves optimum plasma torch performances and optimum plasma flame characteristics by changing components and/or percentages in the gas mixture so as to generate a high-temperature, high-speed and long-arc plasma flame under high-voltage (>85V) and medium-current (<650 A). Since the plasma torch operates at a lower current, the cathode and the anode in the plasma torch exhibit lower erosion rate to enhance the lifetime of the plasma torch.

BRIEF DESCRIPTION OF THE DRAWINGS

The objects and spirits of the embodiments of the present invention will be readily understood by the accompanying drawings and detailed descriptions, wherein.

DETAILED DESCRIPTION OF THE PREFERRED EMBODIMENT

The present invention can be exemplified but not limited by various embodiments as described hereinafter.

In one embodiment of the present invention, the multi-gas mixer uses an independent gas container as a gas source. The gas pressure in each gas container is lowered to the working pressure of 4 to 6 kgw/cm² of the mass flow rate controller. Then, each gas container is connected by way of a pipeline to a corresponding mass flow rate controller to control the gas flow $F_n$. The output of the mass flow rate controller of each gas is coupled to a pipeline to introduce the gas to a gas inlet of the multi-gas mixer. The percentage $R_n$ of each gas in a gas mixture can be controlled by the flow $F_n$ measured by the mass flow rate controller. The percentage $R_n$ of each gas can be arbitrary.

Figure 1:
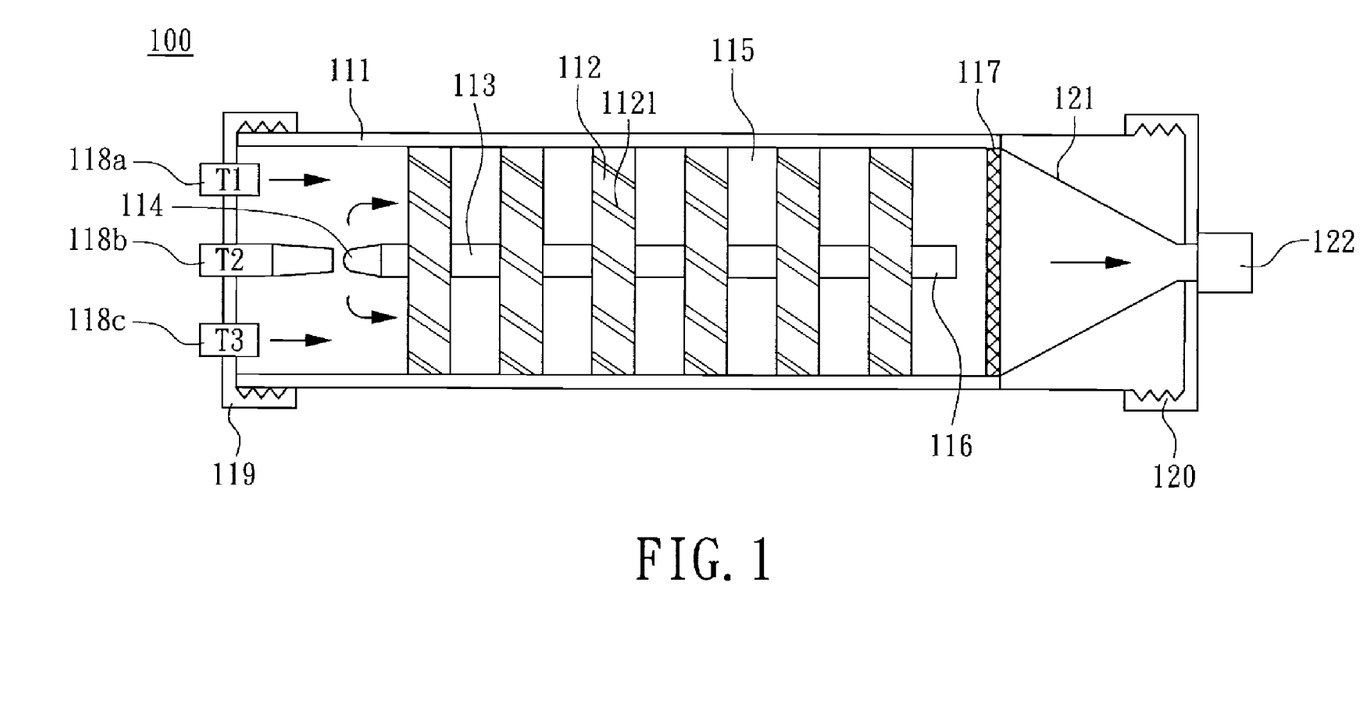
FIG. 1 is a structural diagram of a multi-gas mixer according to a first embodiment of the present invention.

Please refer to FIG. 1, which is a structural diagram of a multi-gas mixer according to a first embodiment of the present invention. In the present embodiment, the multi-gas mixer 100 comprises: a mixer chamber 111, at least one gas rotating and mixing unit 112 (for example, six gas rotating and mixing unit as shown in FIG. 1), a plurality of gap washers 113, a gas inlet screw nut 114, at least one gas rotating and mixing chamber 115, a gas outlet screw nut 116, a filter 117, a plurality of gas inlets (T1, T2, T3, . . . and TN), a gas inlet cap 119, a gas outlet cap 120, a cone-shaped gas exhaust 121 and a gas mixture outlet 122. The number of gas inlets in the present embodiment is three: the first gas inlet (T1) 118a, the second gas inlet (T2) 118b and the third gas inlet (T3) 118c. The arrows in FIG. 1 indicate the directions of the gas flows.

The mixer chamber 111 can be cylindrically symmetric so that the gas components can be rapidly and uniformly mixed according to fluid dynamics. The mixer chamber 111 in the first embodiment is cylindrical with an inner diameter within a range from 3 to 5 cm, which is helpful in assembly of the mixer. The aforementioned sizes are only exemplary and not to limit the scope of the present invention.

In the first embodiment, the multi-gas mixer 100 comprises at least one gas rotating and mixing unit 112 (for example, six gas rotating and mixing unit as shown in FIG. 1) disposed between the plurality of gas inlet 118a, 118b and 118c and the gas mixture outlet 122 along the cylindrically symmetric axis in the mixer chamber 111. Each gas rotating and mixing unit 112 is provided with a plurality of openings used as gas rotating and mixing channels 1121, which are capable of rotating and mixing the gas flow in the chamber 115 enclosed by the inner wall of the mixer chamber 111 and the gas rotating and mixing unit 112 to produce a spiral gas flow along the cylindrically symmetric axis to achieve a uniform gas mixture. In the present invention, each gas passes through the plurality of gas rotating and mixing units 112 to achieve high uniformity of the gas mixture. The thickness of the gas rotating and mixing unit 112 is within a range from 0.8 to 1.2 cm, but the present invention is not limited thereto.

It is preferable that there are 6 to 10 gas rotating and mixing units 112 and 5 to 9 gas rotating and mixing chambers 115 in the present invention. Each gas rotating and mixing unit 112 is provided with 8 to 12 gas rotating and mixing channels 1121. It causes higher cost if the abovementioned numbers are too large, while the uniformity is poor if the abovementioned numbers are too small. The present invention is not limited to the abovementioned numbers.

In the first embodiment, the thicknesses and outer diameters for the plurality of gap washers 113 are respectively 1.6 to 2.2 cm and 9 to 12 mm. The gas rotating and mixing chamber 115 is constructed by the gas rotating and mixing units 112, the gap washers 113 and the inner wall of the mixer chamber 111. More particularly, the gap washers 113 and the gas outlet screw nut 116 are disposed to position the gas rotating and mixing units 112. In the present invention, each gas rotating and mixing unit 112 can be fixedly coupled to the inner wall of the mixer chamber 111 so that the gap washers 113 and the gas outlet screw nut 116 are not required.

The filter 117 in the first embodiment is capable of filtering out the particles in the gas. Generally, there is little possibility that there is any particle in the gas. Accordingly, the filter 117 is not required.

In the present invention, the plurality of gas inlets (T1, T2, T3, . . . and TN) are disposed at the input end of the mixer chamber 111. Each gas inlet can be coupled by way of a pipeline to a respective gas container to provide gas to produce a gas mixture.

In the first embodiment, the gas inlet cap 119 and the gas outlet cap 120 construct a close compartment in the mixer chamber 111, which can be disassembled to replacement the components therein.

In the first embodiment, the cone-shaped gas exhaust 121 is capable of compressing the gas mixture to produce a high-speed gas flow at the gas mixture outlet 122.

In the first embodiment, the gas mixture outlet 122 is disposed at the output end of the mixer chamber 111 along the cylindrically symmetric axis so that the multi-gas mixer 100 is coupled by way of a pipeline to any apparatus that requires a gas mixture, for example, a plasma torch.

In the first embodiment, the gaseous components to be mixed are introduced by way of the first gas inlet (T1) 118a, the second gas inlet (T2) 118b and the third gas inlet (T3) 118c into the mixer chamber 111. If the molecular weights of the gaseous components are similar, the locations and arrangements of the gas inlets are not limited. However, if one of the molecular weights of the gaseous components is relatively large, (for example, the molecular weight of argon in the gas mixture of argon-hydrogen-helium or the gas mixture of argon-hydrogen-nitrogen-helium is relatively large), the gaseous component with the largest molecular weight (such as argon) is introduced by way of the second gas inlet (T2) 118b into the mixer chamber 111. When the gaseous component with larger molecular weight reaches the gas inlet screw nut 114, the flow direction changes and is distributed to the gas rotating and mixing channels 1121 around the gas rotating and mixing units 112 so as to be mixed with other gaseous components with smaller molecular weights.

In the first embodiment, each gas rotating and mixing unit 112 is a clockwise gas rotating and mixing unit so that the rotating gas flow travels according to the right-hand rule. Please refer to FIG. 2A and FIG. 2B, respectively, for a front view and a side view of a clockwise gas rotating and mixing unit in a multi-gas mixer according to a first embodiment of the present invention. In FIG. 2B, each gas rotating and mixing channel 1121 disposed on the gas rotating and mixing unit 112 is oriented parallel with a center axis of the gas rotating and mixing unit 112 and with an inclined angle between a tangential line passing through the channel and the center axis. This angle is a negative polar angle, $-\alpha$. The width of and the depth of each gas rotating and mixing channel 1121 are respectively 1.6 to 3 mm and 5 to 8 mm, while $\alpha$ is within a range from 25° to 45°. However, the present invention is not limited to the aforementioned sizes and angles.

When the width of and the depth of each gas rotating and mixing channel 1121 of the present invention become larger, the gas rotating and mixing unit 112 becomes an apparatus comprising blades, like an electric fan.

Figure 2A:
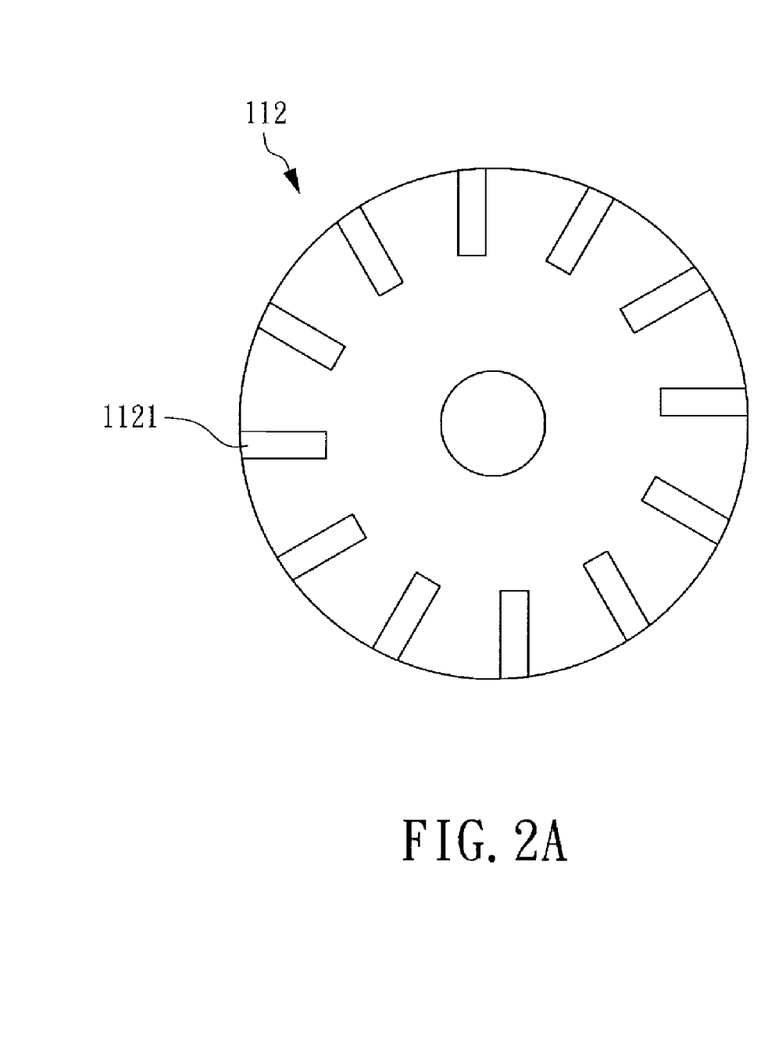
FIG. 2A is a front view of a clockwise gas rotating and mixing unit in a multi-gas mixer according to a first embodiment of the present invention.
Figure 2B:
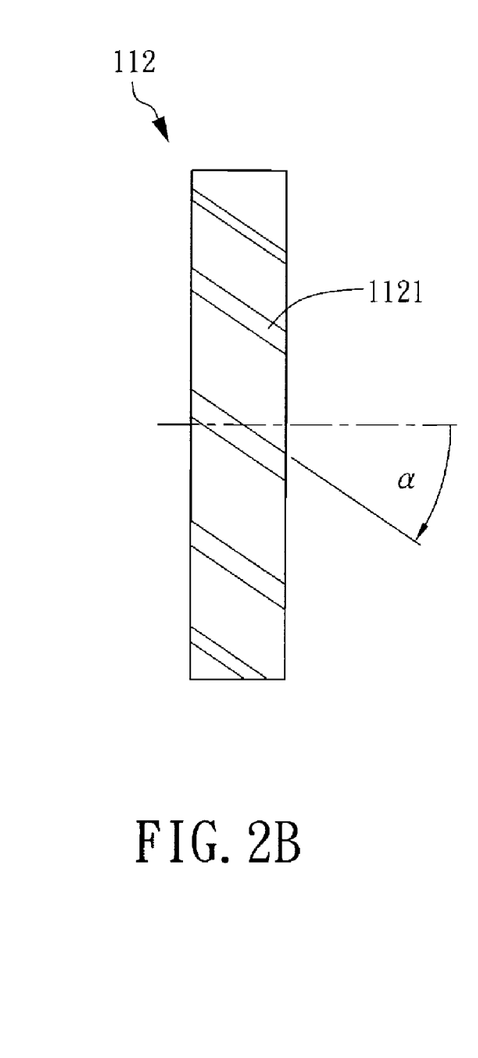
FIG. 2B is a side view of a clockwise gas rotating and mixing unit in a multi-gas mixer according to a first embodiment of the present invention.

In FIG. 2A, each gas rotating and mixing unit 112 is provided with a central through-hole for positioning the gap washer 113 and the gas outlet screw nut 116. More particularly, the gap washers 113 and the gas outlet screw nut 116 are disposed to position the gas rotating and mixing units 112. When each gas rotating and mixing unit 112 is fixedly coupled to the inner wall of the mixer chamber 111, the gap washer 113 and the gas outlet screw nut 116 are not required. Meanwhile, the central through-hole is not required.

Figure 3:
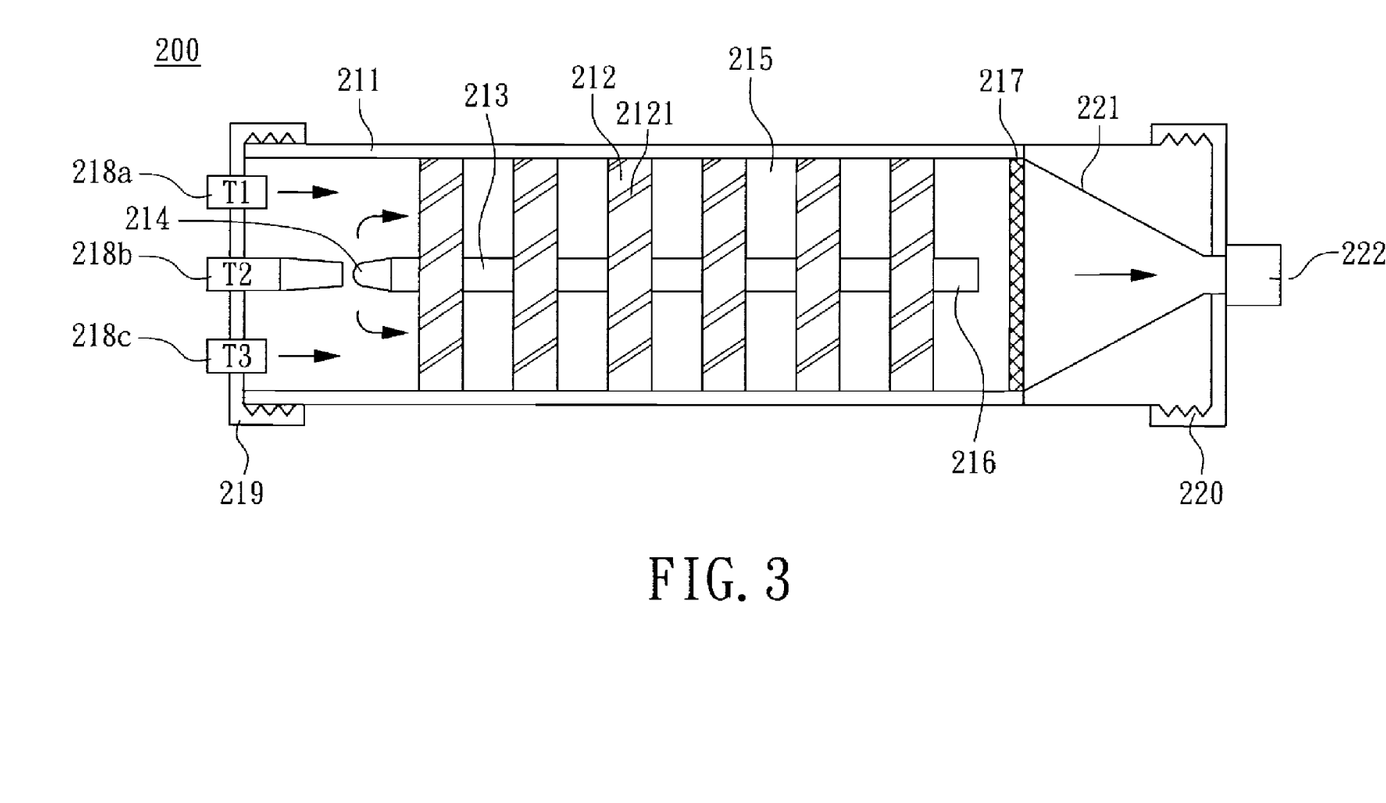
FIG. 3 is a structural diagram of a multi-gas mixer according to a second embodiment of the present invention.

Please refer to FIG. 3, which is a structural diagram of a multi-gas mixer according to a second embodiment of the present invention. In the present embodiment, the multi-gas mixer 200 comprises: a mixer chamber 211, at least one gas rotating and mixing unit 212 (for example, six gas rotating and mixing unit as shown in FIG. 3), a plurality of gap washers 213, a gas inlet screw nut 214, at least one gas rotating and mixing chamber 215, a gas outlet screw nut 216, a filter 217, a plurality of gas inlets (T1, T2, T3, . . . and TN), a gas inlet cap 219, a gas outlet cap 220, a cone-shaped gas exhaust 221 and a gas mixture outlet 222. The number of gas inlets in the present embodiment is three: the first gas inlet (T1) 218a, the second gas inlet (T2) 218b and the third gas inlet (T3) 218c. But the present invention is not limited by the number of gas inlets.

The only difference between the second embodiment and the first embodiment is in the structure of the gas rotating and mixing unit. In the second embodiment, each gas rotating and mixing unit 212 is a counter-clockwise gas rotating and mixing unit so that the rotating gas flow travels according to the left-hand rule. Please refer to FIG. 4A and FIG. 4B, respectively, for a front view and a side view of a counter-clockwise gas rotating and mixing unit in a multi-gas mixer according to a second embodiment of the present invention. In FIG. 4B, each gas rotating and mixing channel 2121 disposed on the gas rotating and mixing unit 212 is oriented parallel with a center axis of the gas rotating and mixing unit 212, and with an inclined angle between a tangential line passing through the channel and the center axis. This angle is a positive polar angle, $\alpha$. The width of and the depth of each gas rotating and mixing channel 2121 are respectively 1.6 to 3 mm and 5 to 8 mm, while $\alpha$ is within a range from 25° to 45°. However, the present invention is not limited to the aforementioned sizes and angles.

When the width of and the depth of each gas rotating and mixing channel 2121 of the present invention become larger, the gas rotating and mixing unit 212 becomes an apparatus comprising blades, like an electric fan.

Figure 4A:
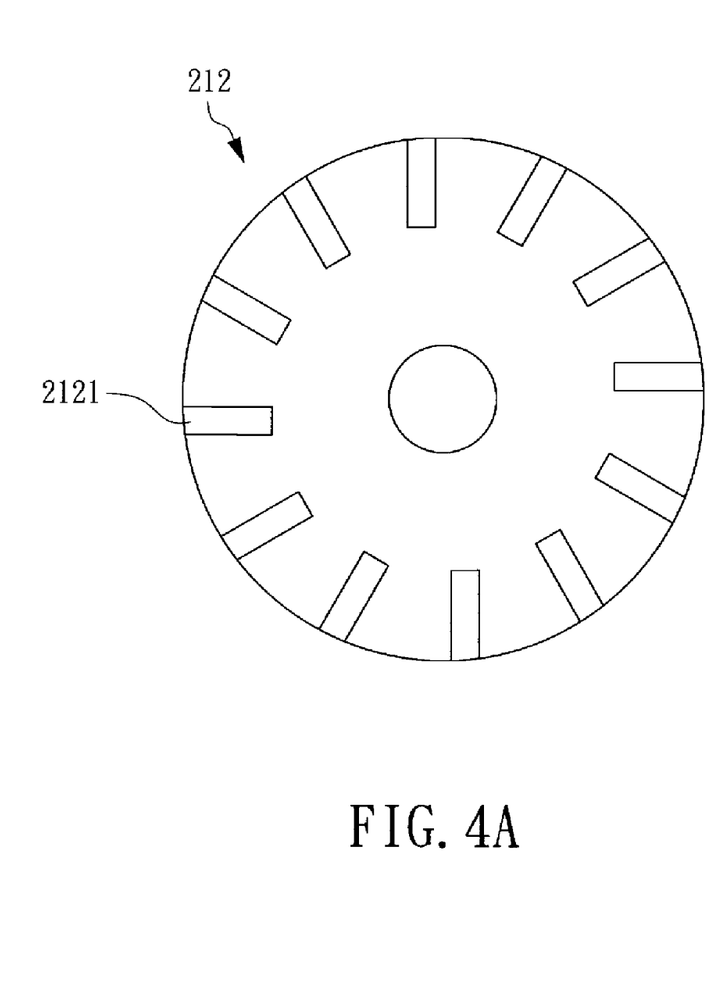
FIG. 4A is a front view of a counter-clockwise gas rotating and mixing unit in a multi-gas mixer according to a second embodiment of the present invention.
Figure 4B:
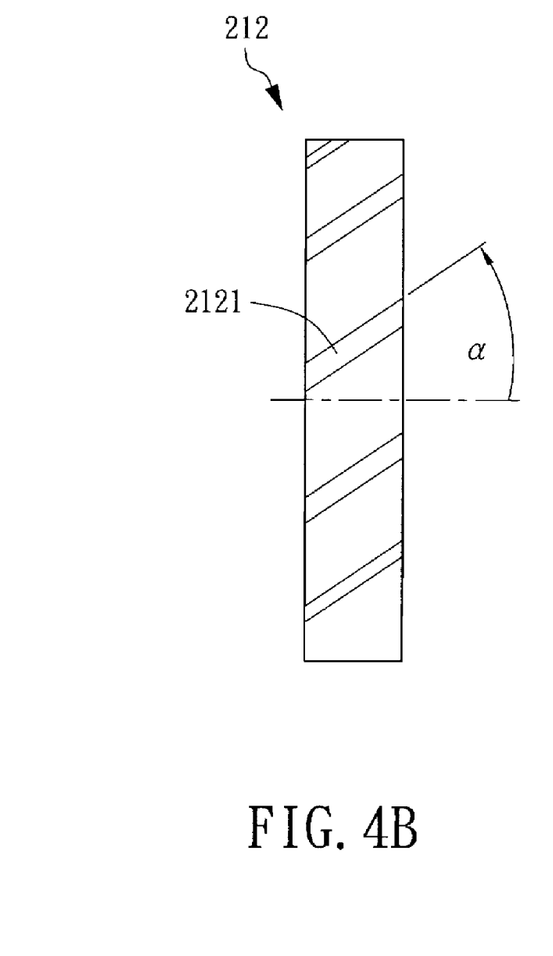
FIG. 4B is a side view of a counter-clockwise gas rotating and mixing unit in a multi-gas mixer according to a second embodiment of the present invention.

In FIG. 4A, each gas rotating and mixing unit 212 is provided with a central through-hole for positioning the gap washer 213 and the gas outlet screw nut 216. When each gas rotating and mixing unit 212 is coupled to the inner wall of the mixer chamber 211, the gap washer 213 and the gas outlet screw nut 216 are not required. Meanwhile, the central through-hole is not required.

Figure 5:
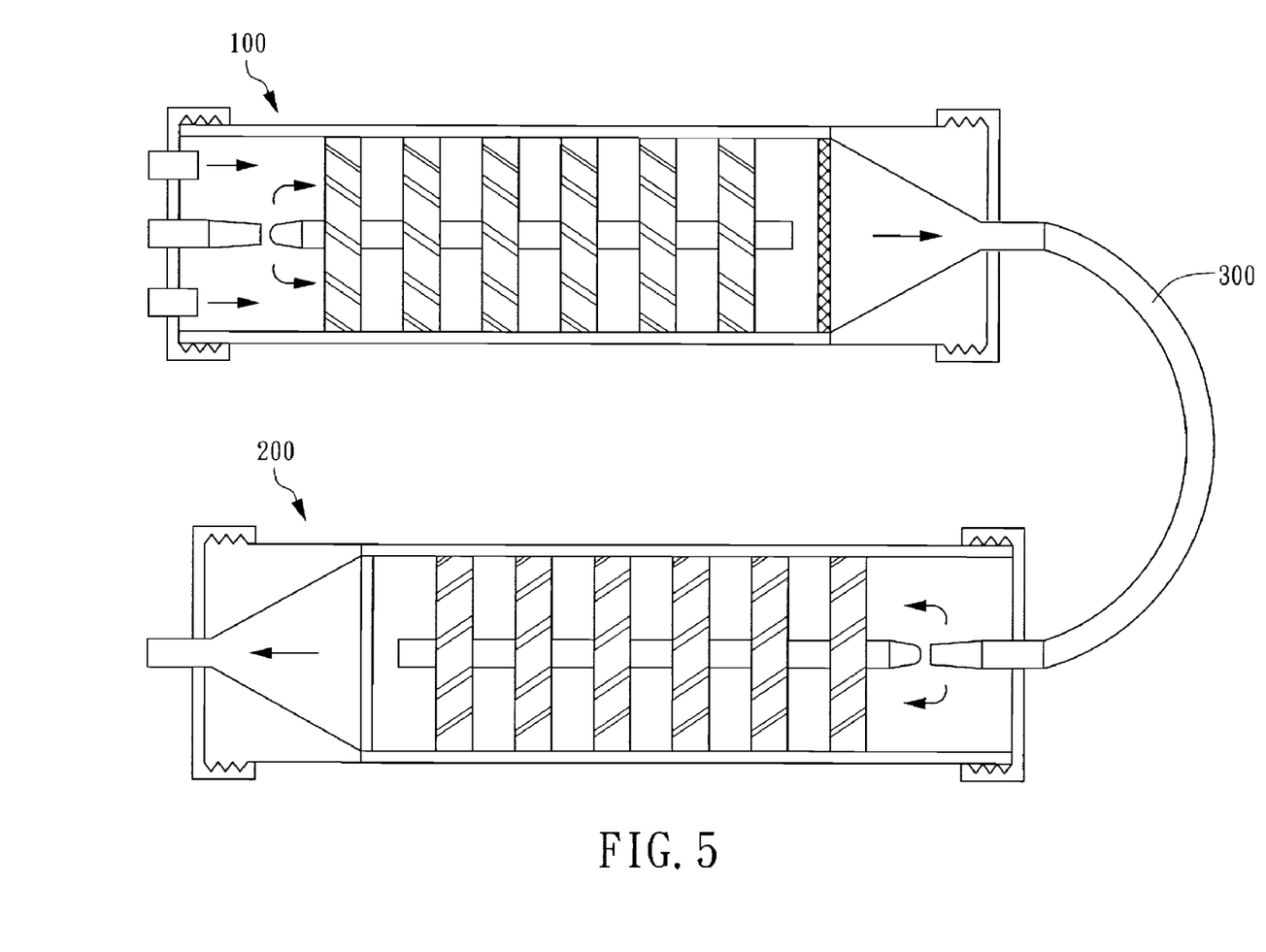
FIG. 5 is a schematic diagram of multi-gas mixers connected in series according to a third embodiment of the present invention.

Please refer to FIG. 5, which is a schematic diagram of multi-gas mixers connected in series according to a third embodiment of the present invention. In the present embodiment, in order to improve the uniformity of the gas mixture and minimize the rotation momentum of the gas mixture, a multi-gas mixer 100 being provided with a plurality of clockwise gas rotating and mixing units and a multi-gas mixer 200 being provided with a plurality of counter-clockwise gas rotating and mixing units can be coupled by way of a flexible pipeline 300. However, the present invention is not limited to the number of multi-gas mixers.

Figure 6:
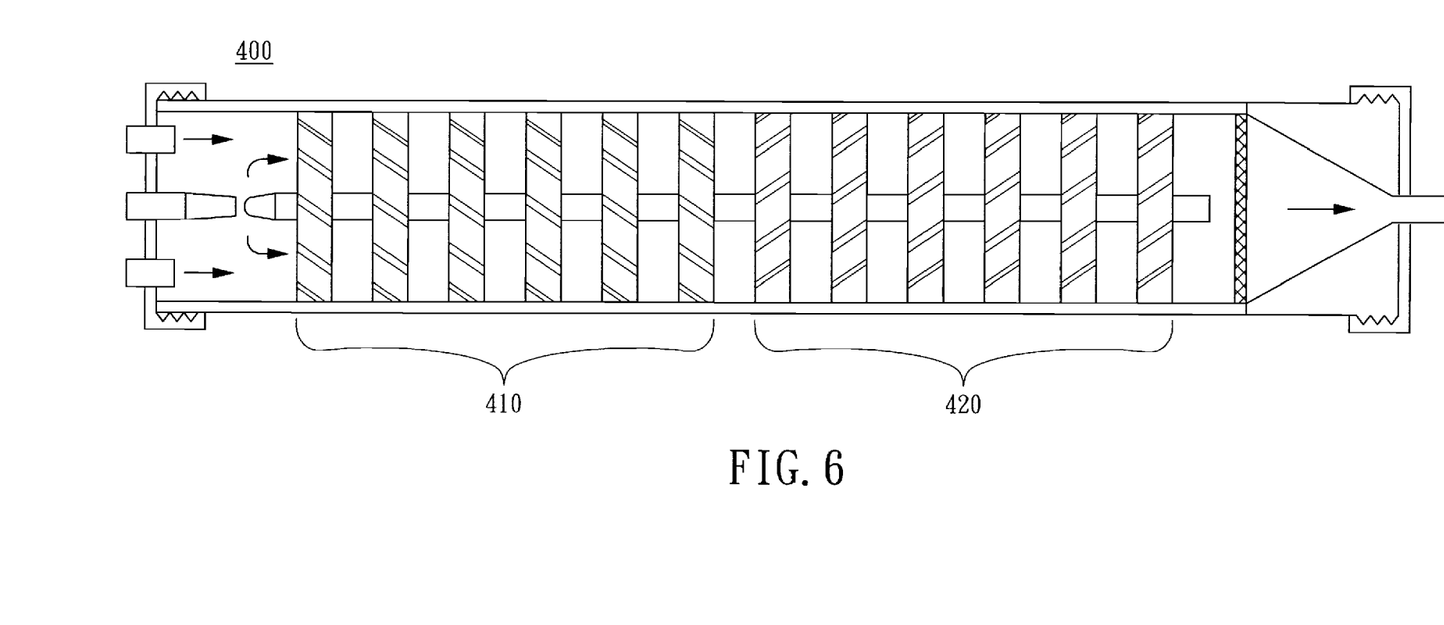
FIG. 6 is a schematic diagram of a composite multi-gas mixer according to a fourth embodiment of the present invention.

Please refer to FIG. 6, which is a schematic diagram of a composite multi-gas mixer according to a fourth embodiment of the present invention. In the present embodiment, in order to improve the uniformity of the gas mixture and minimize the rotation momentum of the gas mixture, a multi-gas mixer 400 is provided with a plurality of gas rotating and mixing unit regions (for example, two gas rotating and mixing unit regions as shown in FIG. 6) in the chamber. Two neighboring gas rotating and mixing unit regions comprise gas rotating and mixing units differently orientated. For example, one region is clockwise and the other is counter-clockwise. In the fourth embodiment, only two gas rotating and mixing unit regions are provided: the first gas rotating and mixing unit region 410 and the second gas rotating and mixing unit region 420. In the present embodiment, the first gas rotating and mixing unit region 410 comprises a plurality of clockwise gas rotating and mixing units, while the second gas rotating and mixing unit region 420 comprises a plurality of counter-clockwise gas rotating and mixing units, which are similar to those in the first embodiment, and hence descriptions thereof are not presented. However, the present invention is not limited to the number of gas rotating and mixing unit regions.

Figure 7:
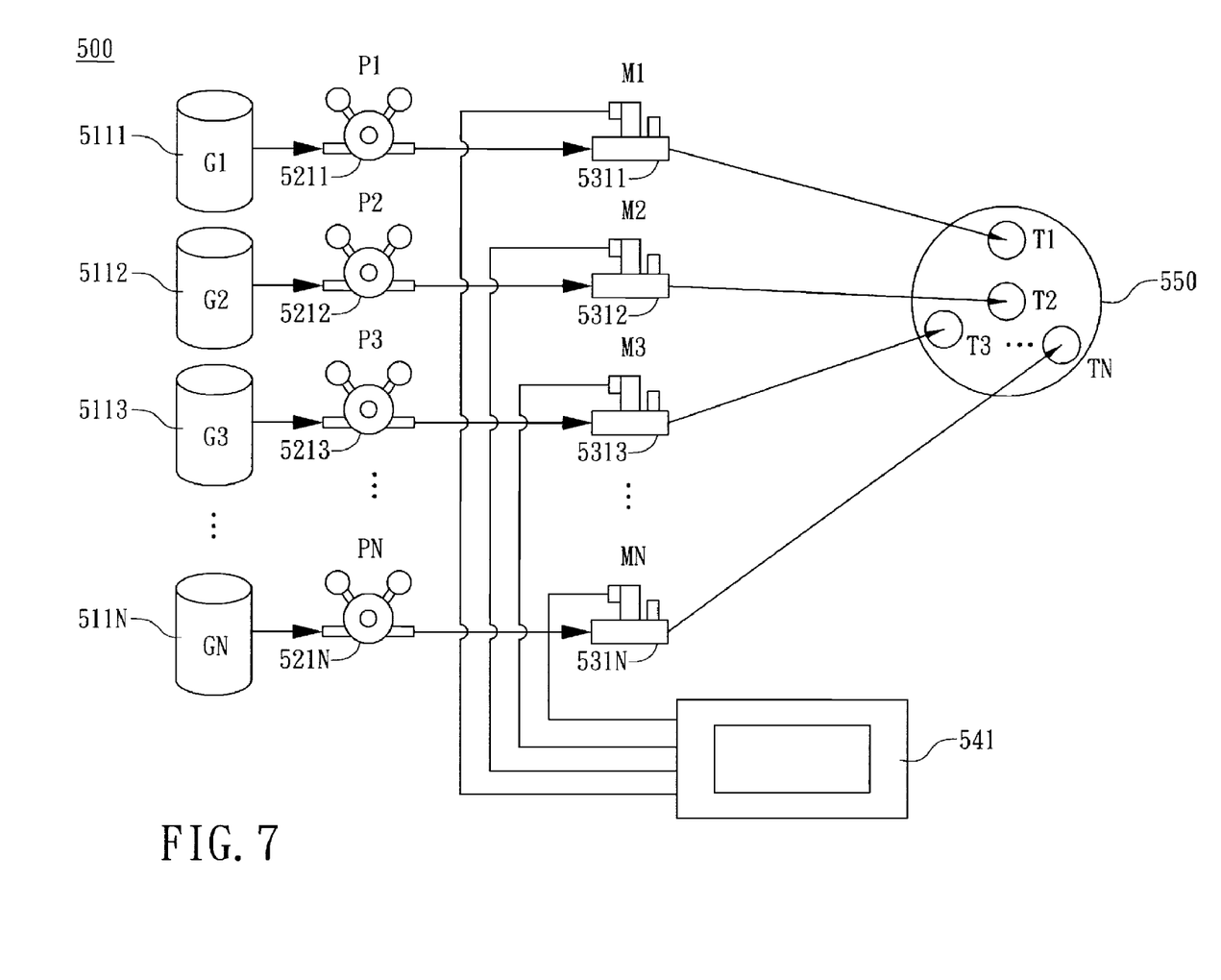
FIG. 7 is a structural diagram of a multi-gas mixing and supplying system according to the present invention.

Please refer to FIG. 7, which is a structural diagram of a multi-gas mixing and supplying system according to the present invention. In the present embodiment, the multi-gas mixing system 500 comprise: a plurality of gas containers 5111 (G1), 5112 (G2), 5113 (G3), . . . and 511N (GN), a plurality of adjusters 5211 (P1), 5212 (P2), 5213 (P3), . . . and 521N (PN), a plurality of mass flow rate controllers 5311 (M1), 5312 (M2), 5313 (M3), . . . and 531N (MN), a control and display unit 541 and a multi-gas mixer 550. Each gas container is filled with a gaseous component as a gas source and is coupled by way of a pipeline to the adjuster, the mass flow rate controller and the multi-gas mixer 550. The multi-gas mixer 550 used in the multi-gas mixing and supplying system 500 can be the multi-gas mixer according to the first embodiment, the second embodiment, the third embodiment or the fourth embodiment of the present invention.

In FIG. 7, taking the first gaseous component G1 for example, the gas container 5111 is coupled to the adjuster 5211, while the adjuster 5211 is further coupled to the mass flow rate controller 5311, which is coupled to the gas inlet T1 of the multi-gas mixer 550. A wire connects the mass flow rate controller 5311 and the control and display unit 541 so as to control and monitor the flow $F_1$ of the first gaseous component G1 through the mass flow rate controller 5311. As a result, the percentage $R_1$ of the first gaseous component G1 introduced by way of the gas inlet T1 into the multi-gas mixer 550 can be obtained. The other gas components are delivered, controlled and coupled in similar ways as the first gaseous component G1, and thus descriptions thereof are not presented. The method and apparatus for mixing each gas with pre-determined percentage are disclosed as above.

The gas mixture can be widely used, such as the plasma spray, plasma cutting and plasma cleaning. In most applications, the gas mixture uses argon, helium, hydrogen and nitrogen. To better describe the spirits and scope of the present invention, the multi-gas mixer of the present invention can be further described in details. Please refer to FIG. 8, which is a structural diagram of a four-gas mixing and supplying system according to the present invention. In the present embodiment, the four-gas mixing and supplying system 600 comprises: a nitrogen gas container 6111 ($N_2$), an argon container 6112 (Ar), a hydrogen container 6113 ($H_2$), a helium container 6114 (He), a nitrogen adjuster 6211, an argon adjuster 6212, a hydrogen adjuster 6213, a helium adjuster 6214, a nitrogen mass flow rate controller 6311 ($M_{N2}$), an argon mass flow rate controller 6312 ($M_{Ar}$), a hydrogen mass flow rate controller 6313 ($M_{H2}$), a helium mass flow rate controller 631N ($M_{He}$), a control and display unit 641 and a four-gas mixer 650. The abovementioned components are positioned and arranged like the multi-gas mixing and supplying system 500 in FIG. 7. The gas flows $F_{N2}$, $F_{Ar}$, $F_{H2}$, $F_{He}$ and percentages $R_{N2}$, $R_{Ar}$, $R_{H2}$, $R_{He}$ are controlled similarly. The four-gas mixer 650 in the multi-gas mixing and supplying system 600 can be a multi-gas mixer with at least four gas inlets according to the first embodiment, the second embodiment, the third embodiment or the fourth embodiment.

Figure 8:
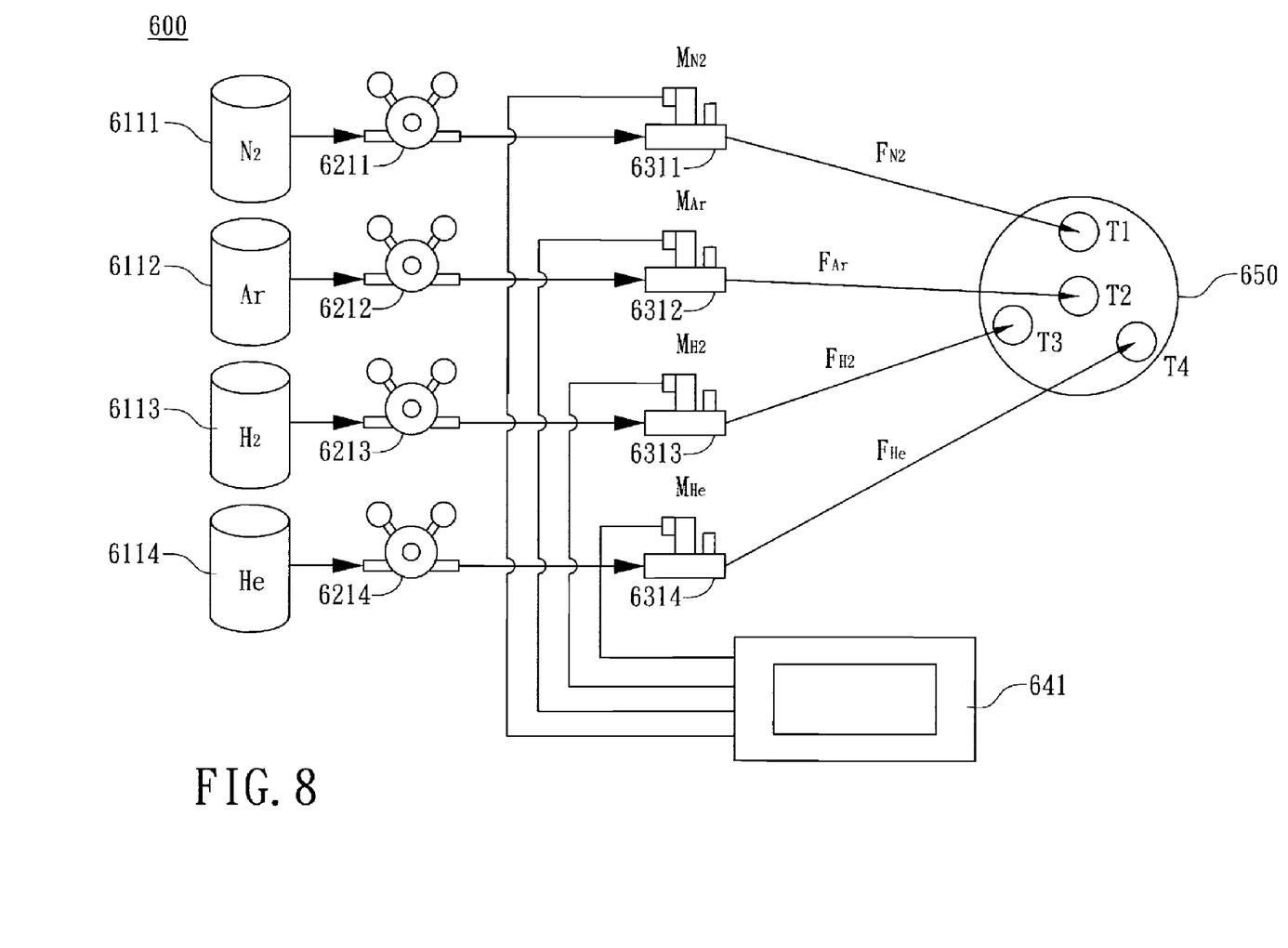
FIG. 8 is a structural diagram of a four-gas mixing and supplying system according to the present invention.

The four-gas mixer 650 in the four-gas mixing and supplying system 600 in FIG. 8 is provided with four gas inlets T2, T2, T3 and T4. T2 is disposed on the cylindrically symmetric axis in the four-gas mixer 650, while T1, T3 and T4 are disposed on the periphery near the chamber wall of the four-gas mixer 650. Among argon, helium, hydrogen and nitrogen, argon exhibits the maximum molecular weight so that argon is introduced by way of the gas inlet T2 on the four-gas mixer 650 into the mixer chamber. When argon reaches the gas inlet screw nut, the flow direction changes and is distributed to the gas rotating and mixing channels around the gas rotating and mixing units so as to be mixed with other gaseous components. Argon, helium, hydrogen and nitrogen passes through the gas rotating and mixing channels and then rotates inside the gas rotating and mixing chambers to diffuse and be mixed. Furthermore, argon, helium, hydrogen and nitrogen exhibit higher mixing uniformity in the gas mixture by passing through the gas rotating and mixing units.

Figure 9:
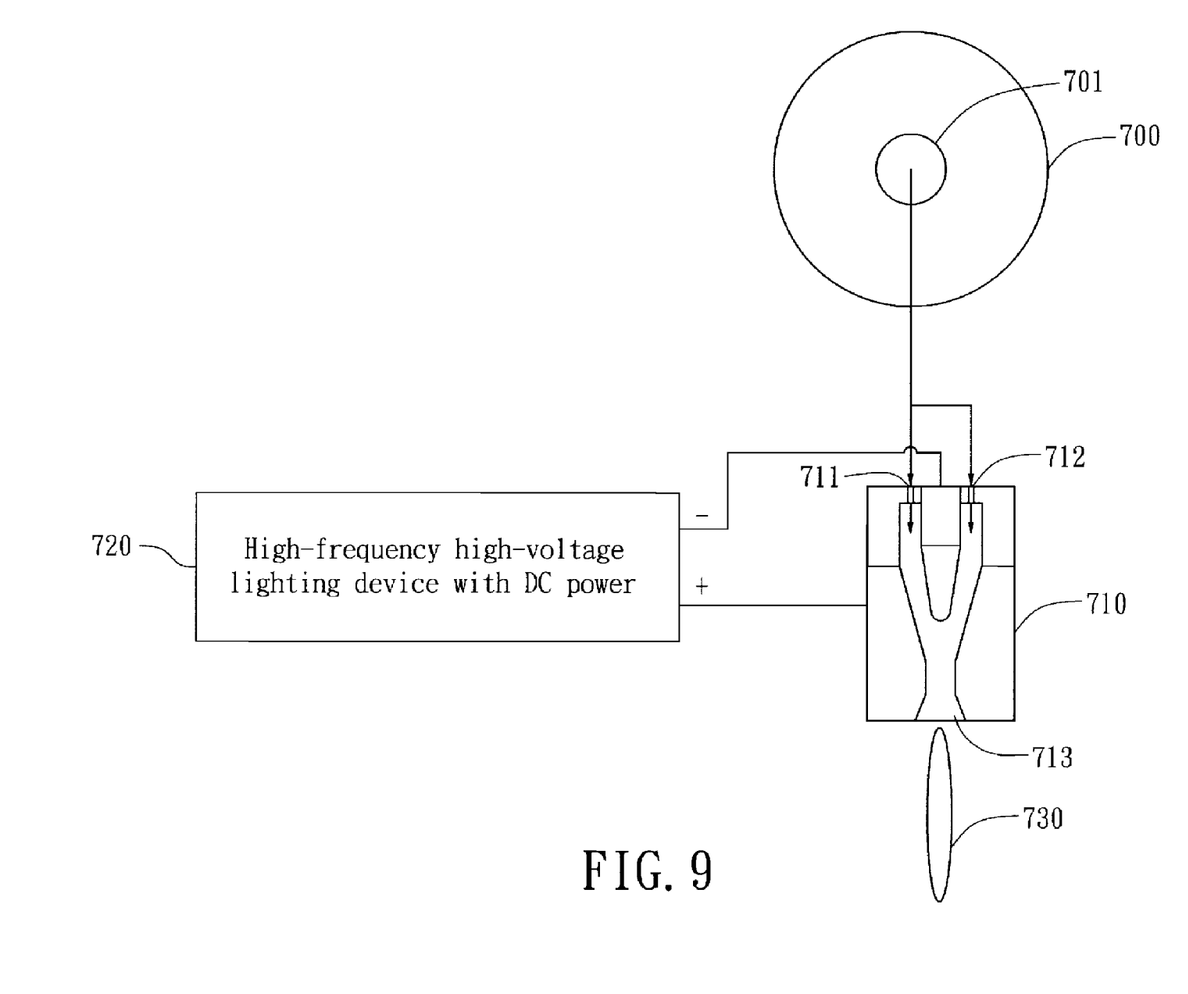
FIG. 9 is a schematic diagram of a system comprising a multi-gas mixing and supplying system, a plasma torch and a high-frequency high-voltage lighting device with DC power.

Please refer to FIG. 9, which is a schematic diagram of a system comprising a multi-gas mixing and supplying system 700, a plasma torch 710 and a high-frequency high-voltage lighting device with DC power 720. The multi-gas mixer used in the multi-gas mixing and supplying system 700 is a multi-gas mixer according to the first embodiment, the second embodiment, the third embodiment or the fourth embodiment of the present invention.

The plasma torch 710 in FIG. 9 is provided with a first inlet 711, a second inlet 712 and a plasma flame nozzle 713. When the plasma torch 710 is electrically connected to a high-frequency high-voltage lighting device with DC power 720, the high-frequency high-voltage lighting device with DC power 720 can be a lighting device of the plasma torch 710. When the gas mixture produced by the multi-gas mixing and supplying system 700 is introduced by way of a pipeline, the first inlet 711 and the second inlet 712 into the plasma torch 710, a plasma flame 730 can be generated from the plasma flame nozzle 713 to turn on the lighting device. The inlets 711 and 712 can be merged to be one inlet if the gas mixture between the anode and the cathode of the plasma torch 710 is uniformly distributed by a gas distribution ring inside the plasma torch. The present invention is not limited to the number of inlets to the plasma torch.

When the multi-gas mixer, the multi-gas mixing and supplying system and the high-speed plasma torch are used together, the plasma flame characteristics can be adjusted. The multi-gas mixing apparatus achieves optimum plasma torch performances and optimum plasma flame characteristics by changing components and/or percentages in the gas mixture so as to generate a high-temperature, high-speed and long-arc plasma flame under high-voltage (>85V) and medium-current (<650 A). Since the plasma torch operates at a lower current, the cathode and the anode in the plasma torch exhibit lower erosion rate to enhance the lifetime of the plasma torch. The long-arc, high-temperature and high-speed plasma flame can be generated to be applied in plasma spray coating, plasma cutting, plasma cleaning and sterilization. When it comes to plasma spray coating, the heating efficiency of the powders can be enhanced. Therefore, the heated powders can be deposited on a substrate to form a high-strength, porous electrode membrane or high-strength, high density membrane for the manufacture of a solid oxide fuel cell.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A multi-gas mixer, comprising:
   a mixer chamber, comprising:
   a plurality of gas inlets, respectively coupled to pipelines to various gas containers for providing gas to produce a gas mixture; at least one clockwise or counter-clockwise gas rotating and mixing unit or a combination of clockwise and counter-clockwise gas rotating and mixing units, disposed in the mixer chamber, so that a plurality of gas rotating and mixing channels, disposed on the periphery of each clockwise or counter-clockwise gas rotating and mixing unit or disposed on the periphery of each of the combination of clockwise and counter-clockwise gas rotating and mixing units, are oriented to produce a spiral gas flow with axial motion along a symmetric axis of the mixer chamber and enclosed by the inner wall of the mixer chamber to achieve an uniform gas mixture with an arbitrary percentage of each gas; and a gas mixture outlet along the symmetric axis of the mixer chamber to provide a high-speed gas flow after the gas mixture is exhausted from the mixer chamber.

2. The multi-gas mixer as recited in claim 1, wherein the gas rotating and mixing channels is of each gas rotating and mixing unit are oriented to have the same inclined angle between a tangential line passing through the channel and a center axis of the mixer chamber, the inclined angle being a negative polar angle.

3. The multi-gas mixer as recited in claim 2, wherein the absolute value of the negative polar angle is larger than 25° and smaller than 45°.

4. The multi-gas mixer as recited in claim 1, wherein the gas rotating and mixing channels of each gas rotating and mixing unit are oriented to have the same inclined angle between a tangential line passing through the channel and a center axis of the mixer chamber, the inclined angle being a positive polar angle.

5. The multi-gas mixer as recited in claim 4, wherein the absolute value of the positive polar angle is larger than 25° and smaller than 45°.

6. The multi-gas mixer as recited in claim 1, wherein the at least one gas rotating and mixing unit is disposed in at least one gas rotating and mixing unit region, the at least one gas rotating and mixing unit region comprising at least one gas rotating and mixing unit, the at least one gas rotating and mixing unit in the gas rotating and mixing unit region comprising gas rotating and mixing channels being identically orientated, and neighboring gas rotating and mixing unit regions comprising gas rotating and mixing channels differently orientated.

7. The multi-gas mixer as recited in claim 1, wherein a mass flow rate controller is coupled between each of the gas inlets and a gas container therewith so as to control and monitor the gas flow through each of the gas inlets.

8. The multi-gas mixer as recited in claim 1, wherein the at least one gas rotating and mixing unit is fixedly coupled to the inner wall of the mixer chamber.

9. The multi-gas mixer as recited in claim 1, further comprising a plurality of gap washers and a gas outlet screw nut for positioning the at least one gas rotating and mixing unit.

10. The multi-gas mixer as recited in claim 9, wherein the at least one gas rotating and mixing unit is provided with a central through-hole for positioning the gap washer or the gas outlet screw nut.

11. A multi-gas mixing apparatus, comprising:
a plurality of multi-gas mixers, each of the multi-gas mixers further comprising:
a plurality of gas inlets, respectively coupled to pipelines to various gas containers for providing gas to produce a gas mixture;
at least one clockwise or counter-clockwise gas rotating and mixing unit or a combination of clockwise and counter-clockwise gas rotating and mixing units, disposed in the mixer chamber, so that a plurality of gas rotating and mixing channels, disposed on the periphery of each clockwise or counter-clockwise gas rotating and mixing unit or disposed on the periphery of each of the combination of clockwise and counter-clockwise gas rotating and mixing units, are oriented to produce a spiral gas flow with axial motion along a symmetric axis of the mixer chamber and enclosed by the inner wall of the mixer chamber to achieve an uniform gas mixture with an arbitrary percentage of each gas; and a gas mixture outlet along the symmetric axis of the mixer chamber to provide a high-speed gas flow after the gas mixture is exhausted from the mixer chamber; and
at least one flexible pipeline for coupling two of the plurality of multi-gas mixers.

12. The multi-gas mixing apparatus as recited in claim 11, wherein the at least one gas rotating and mixing unit is fixedly coupled to the inner wall of the mixer chamber.

13. The multi-gas mixing apparatus as recited in claim 11, wherein each of the multi-gas mixers further comprises a plurality of gap washers and a gas outlet screw nut for positioning the at least one gas rotating and mixing unit.

14. The multi-gas mixer as recited in claim 13, wherein the at least one gas rotating and mixing unit is provided with a central through-hole for positioning the gap washer or the gas outlet screw nut.

15. The multi-gas mixing apparatus as recited in claim 11, wherein the at least one gas rotating and mixing unit in the multi-gas mixer comprising the gas rotating and mixing channels being identically orientated, and neighboring multi-gas mixers comprising the gas rotating and mixing channels differently orientated.

16. A plasma torch system, comprising:
a plasma torch;
a high-frequency high-voltage lighting device with DC power, connected with a cathode and an anode of the plasma torch;
a multi-gas mixer coupled to the plasma torch to provide the plasma torch with a gas mixture to generate a plasma flame, comprising:
a mixer chamber, comprising:
a plurality of gas inlets, respectively coupled to pipelines to various gas containers for providing gas to produce a gas mixture;
at least one clockwise or counter-clockwise gas rotating and mixing unit or a combination of clockwise and counter-clockwise gas rotating and mixing units, disposed in the mixer chamber, so that a plurality of gas rotating and mixing channels, disposed on the periphery of each clockwise or counter-clockwise gas rotating and mixing unit or disposed on the periphery of each of the combination of clockwise and counter-clockwise gas rotating and mixing units, are oriented to produce a spiral gas flow with axial motion along a symmetric axis of the mixer chamber and enclosed by the inner wall of the mixer chamber to achieve an uniform gas mixture with an arbitrary percentage of each gas; and a gas mixture outlet along the symmetric axis of the mixer chamber to provide a high-speed gas flow after the gas mixture is exhausted from the mixer chamber.

17. The plasma torch system as recited in claim 16, wherein the gas rotating and mixing channels of each gas rotating and mixing unit are oriented to have the same inclined angle between a tangential line passing through the channel and a center axis of the mixer chamber, the inclined angle being a negative polar angle.

18. The plasma torch system as recited in claim 17, wherein the absolute value of the negative polar angle is larger than 25° and smaller than 45°.

19. The plasma torch system as recited in claim 16, wherein the gas rotating and mixing channels of each gas rotating and mixing unit are oriented to have the same inclined angle between a tangential line passing through the channel and a center axis of the mixer chamber, the inclined angle being a positive polar angle.

20. The plasma torch system as recited in claim 19, wherein the absolute value of the positive polar angle is larger than 25° and smaller than 45°.

21. The plasma torch system as recited in claim 16, wherein the at least one gas rotating and mixing unit is disposed in at least one gas rotating and mixing unit region, the at least one gas rotating and mixing unit region comprising at least one gas rotating and mixing unit, the at least one gas rotating and mixing unit in the at least one gas rotating and mixing unit region comprising gas rotating and mixing channels being identically orientated, and neighboring gas rotating and mixing unit regions comprising gas rotating and mixing channels differently orientated.

22. The plasma torch system as recited in claim 16, wherein a mass flow rate controller is coupled between each of the gas inlets and a gas container therewith so as to control and monitor the gas flow through each of the gas inlets.

23. The plasma torch system as recited in claim 16, wherein the plasma torch is capable of generating a high-temperature, high-speed and long-arc plasma flame under high-voltage (>85V) and medium-current (<650 A).

24. The plasma torch system as recited in claim 16, wherein the plasma torch achieves optimum plasma torch performances and optimum plasma flame characteristics by changing components and/or percentages in the gas mixture.

25. The plasma torch system as recited in claim 16, wherein the at least one gas rotating and mixing unit is fixedly coupled to the inner wall of the mixer chamber.

26. The plasma torch system as recited in claim 16, wherein the multi-gas mixer further comprises a plurality of gap washers and a gas outlet screw nut for positioning the at least one gas rotating and mixing unit.

27. The plasma torch system as recited in claim 26, wherein the at least one gas rotating and mixing unit is provided with a central through-hole for positioning the gap washer or the gas outlet screw nut.

* * * * *